US008081162B2

(12) United States Patent
Teoh et al.

(10) Patent No.: US 8,081,162 B2
(45) Date of Patent: Dec. 20, 2011

(54) OPTICAL NAVIGATION DEVICE WITH SURFACE AND FREE SPACE NAVIGATION

(75) Inventors: Edward Kah Ching Teoh, Selangor (MY); Yat Kheng Leong, Selangor (MY); Jin Kiong Ang, Sungai Ara (MY); Wui Pin Lee, Bayan Lepas (MY); Ban Kuan Koay, Bayan Lepas (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1103 days.

(21) Appl. No.: 11/749,700

(22) Filed: May 16, 2007

(65) Prior Publication Data

US 2008/0288205 A1 Nov. 20, 2008

(51) Int. Cl.
*G09G 5/08* (2006.01)
*G06F 3/033* (2006.01)

(52) U.S. Cl. ........................................ 345/166; 345/158

(58) Field of Classification Search .......... 345/156–179; 178/18.01–18.09, 18.11, 19.01–19.06, 20.01
See application file for complete search history.

(56) References Cited

U.S. PATENT DOCUMENTS

| | | | | |
|---|---|---|---|---|
| 4,131,367 A | * | 12/1978 | French et al. | 356/405 |
| 5,596,387 A | * | 1/1997 | Takagi | 396/50 |
| 5,786,804 A | | 7/1998 | Gordon | |
| 5,847,695 A | * | 12/1998 | Duncan et al. | 345/163 |
| 6,164,808 A | * | 12/2000 | Shibata et al. | 700/85 |
| 6,229,913 B1 | * | 5/2001 | Nayar et al. | 382/154 |
| 6,300,938 B1 | | 10/2001 | Culver | |
| 6,525,306 B1 | * | 2/2003 | Bohn | 250/221 |
| 7,061,468 B2 | * | 6/2006 | Tiphane et al. | 345/158 |
| 2004/0246229 A1 | * | 12/2004 | Yamada | 345/156 |
| 2005/0243062 A1 | * | 11/2005 | Liberty | 345/158 |

OTHER PUBLICATIONS

Avago Technologies, "ADNS-3060, High-performance Optical Mouse Sensor", Jan. 2007, p. 1-38.
Agilent Technologies, "ADNK-3061, Optical Mouse Designer's Kit", Nov. 8, 2004, p. 1-4.
Avago Technologies, "ADNS-3060, Optical Mouse Sensor", Sep. 16, 2006, p. 1-3.

* cited by examiner

*Primary Examiner* — Stephen Sherman

(57) ABSTRACT

An optical navigation device for operation in a surface navigation mode and a free space navigation mode is described. One embodiment of the optical navigation device includes a microcontroller, a surface navigation sensor, and a free space navigation sensor. The surface and free space navigation sensors are coupled to the microcontroller. The microcontroller is configured to process a movement of the optical navigation device. The surface navigation sensor is configured to generate a surface navigation signal in response to a surface navigation image. The free space navigation sensor is configured to generate a free space navigation signal in response to a free space navigation image. Embodiments of the optical navigation device facilitate an integrated optical solution to provide desktop navigation and scene navigation in a single optical navigation device.

20 Claims, 6 Drawing Sheets

OPTICAL NAVIGATION DEVICE WITH SURFACE AND FREE SPACE NAVIGATION

BACKGROUND OF THE INVENTION

Optical navigation sensors are conventionally used for surface navigation applications. For example, conventional optical navigation sensors are implemented in optical mouse devices for desktop computers. In surface optical navigation, the optical navigation sensor tracks the features of the navigation surface on which the device is moved.

More recently, optical navigation sensors have been used for free space navigation applications such as scene navigation. In some conventional embodiments, an optical navigation sensor for surface navigation is converted for use in free space applications by putting a wide angle lens on the optical sensor to track free space features. These conventional free space navigation devices are used for applications such as free-space presentation pointers and controllers. Other conventional technologies are also implemented to facilitate free space navigation operations. For example, some conventional free-space pointers use one or more mechanical gyroscopes (or gyro sensors) to provide navigation in the absence of surface features.

Despite the availability of individual surface and free space navigation devices, conventional optical navigation devices do not provide the functionality of both surface and free space navigation capability in a single device. When a user gives a presentation, for example using a desktop computer, the user typically uses a mouse and a separate pointer to navigate the presentation. The mouse provides surface navigation functionality, while the separate pointer provides free space navigation functionality.

Additionally, conventional surface optical navigation devices that are converted for use in free space navigation applications do not perform particularly well. While some conventional optical navigation devices implement image cross correlation based on images obtained by the sensor using a free space lens, such conventional technology has certain limitations. Many of these limitations originate from the failure of the free space navigation technology to control the light source for the scene. For example, conventional scene navigation devices have difficulty navigating in a low-light environment. Additionally, a light source that flickers (e.g., a fluorescent lamp or a television or computer monitor) results in an illusion that the optical navigation device is moving because the light flashes cause jitter, or noise, in the navigation signals.

Another problem with conventional free space optical navigation devices is the inability to navigate in environments with relatively few features. For example, conventional free space optical navigation devices have difficulty navigating using images of blank walls because the resolution of the imaged scene is too low to detect features of the blank wall. In comparison, surface optical navigation devices have relatively high resolution because of the proximity of the optical device and sensor to the surface features. However, once a surface optical navigation device is lifted or otherwise removed from close proximity with the navigation surface, it does not work properly and also fails to facilitate free-space navigation using free space images.

Another problem with conventional free space optical navigation devices is related to detection of three-dimensional movement of the optical navigation device. Conventional optical navigation devices for detecting three-dimensional movement are costly because they use two optical sensors. Using two optical sensors also consumes more power. Using multiple optical sensors also increases the complexity of the optical sensor design. In particular, it is more complex to integrate two sensors with a single microprocessor.

SUMMARY OF THE INVENTION

Embodiments of an apparatus are described. In one embodiment, the apparatus is an optical navigation device for operation in a surface navigation mode and a free space navigation mode. One embodiment of the optical navigation device includes a microcontroller, a surface navigation sensor, and a free space navigation sensor. The surface and free space navigation sensors are coupled to the microcontroller. The microcontroller is configured to process a movement of the optical navigation device. The surface navigation sensor is configured to generate a surface navigation signal in response to a surface navigation image. The free space navigation sensor is configured to generate a free space navigation signal in response to a free space navigation image. Embodiments of the optical navigation device facilitate an integrated optical solution to provide desktop navigation and scene navigation in a single optical navigation device. Other embodiments of the apparatus are also described.

Embodiments of a method are also described. In one embodiment, the method is an optical navigation method for operating an optical navigation device in a surface navigation mode and a free space navigation mode. One embodiment of the method includes detecting an operating locality of the optical navigation device relative to a navigation surface. The method also includes identifying a change in the operating locality of the optical navigation device relative to the navigation surface. The change in the operating locality may include a change between a surface operating locality and a free space operating locality. The method also includes switching between a surface navigation mode and a free space navigation mode in response to the change in the operating locality of the optical navigation device. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
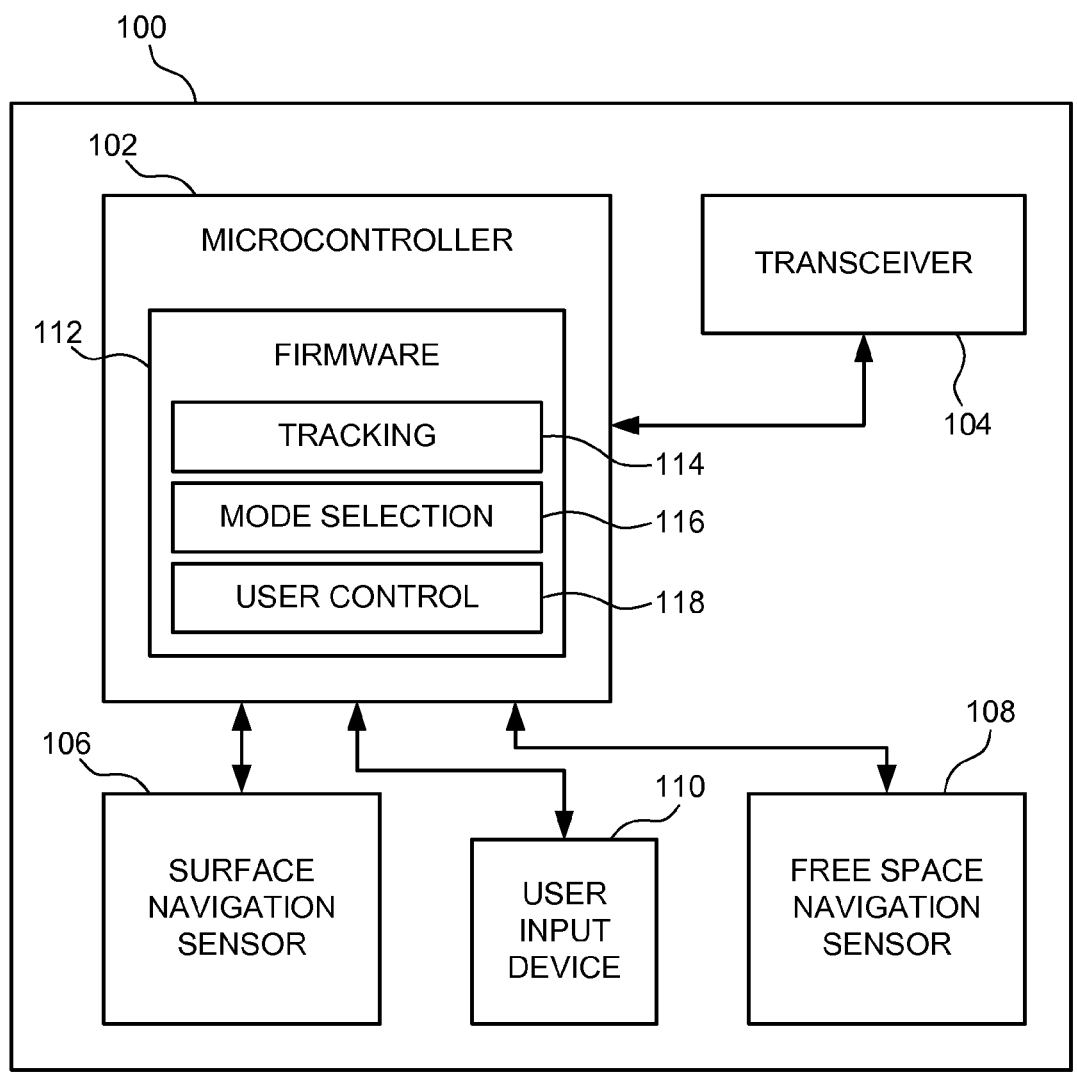
FIG. 1 depicts a schematic block diagram of one embodiment of an optical navigation device with surface and free space navigation.

FIG. 1 depicts a schematic block diagram of one embodiment of an optical navigation device 100 with surface and free space navigation. In this way, the optical navigation device 100 facilitates an integrated optical navigation device capable of both surface (e.g., desktop) and free space (e.g., scene) navigation. It should be noted that the terms surface and free space do not necessarily designate a particular distance between the optical navigation device 100 and a navigation surface. In general, surface navigation occurs where surface features of the navigation surface are distinguishable, for example, using conventional surface navigation technology. Free space navigation begins at about the boundary where surface navigation performance decreases. However, surface and free space navigation zones are not necessarily mutually exclusive and may depend on the application for which the optical navigation device is designed and/or implemented.

The illustrated optical navigation device 100 includes a microcontroller 102, a transceiver 104, a surface navigation sensor 106, a free space navigation sensor 108, and a user input device 110. Although certain component parts are shown in conjunction with the optical navigation device 100 of FIG. 1, other embodiments may include fewer or more component parts, or equivalent parts to perform fewer or more navigation functions. For example, some embodiments of the optical navigation device 100 may include a transmitter rather than the transceiver 104 for applications in which one-way data transmissions are sufficient. As another example, some embodiments of the optical navigation device 100 may implement a single navigation sensor with different optical lens systems—one optical lens system for surface sensing and another optical lens system for free space sensing.

In one embodiment, the microcontroller 102 controls the operation of the optical navigation device 100. For example, the microcontroller 102 sends signals to and processes various signals from the transceiver 104, the surface navigation sensor 106, the free space navigation sensor 108, and the user input device 110. It should be noted that the same microprocessor 102 may be used to communicate with both the surface navigation sensor 106 and the free space navigations sensor 108.

Exemplary embodiments of the surface navigation sensor 106 and the free space navigation sensor 108 are shown and described in more detail with reference to FIGS. 2 and 3. However, it should be noted that the surface navigation sensor 106 may be used to facilitate a surface navigation mode such as desktop navigation, and the free space navigation sensor 108 may be used to facilitate a free space navigation mode such as scene navigation.

In one embodiment, the microcontroller 102 implements a variety of functions, including transmitting data to and receiving data from a host computer system (not shown) via the transceiver 104. The transceiver 104 may be a wireless transceiver or a wired transceiver.

The depicted microcontroller 102 includes firmware 112 which stores data and instructions to implement the various operations of the optical navigation device 100. The firmware 112 is one example of a computer readable storage medium which embodies a program of machine-readable instructions that are executable by a digital processor to perform certain operations related to optical navigation. Other embodiments of computer readable storage media may also be implemented and used. The microcontroller 102 also includes logic to implement one or more algorithms related to the functionality of the optical navigation device 100. In one embodiment, the firmware 112 includes tracking logic 114, mode selection logic 116, and user control logic 118.

The tracking logic 114 implements an algorithm to track the location of the optical navigation device 100 according to one or more signals from the surface navigation sensor 106 and/or the free space navigation sensor 108. Alternatively, the tracking logic 114 may implement different algorithms for each of the surface navigation mode and the free space navigation mode. The location information from the tracking logic 114 may be transmitted, for example, to a host computer (not shown) via the transceiver 104. In one embodiment, the tracking logic 114 is configured to process a surface navigation signal from the surface navigation sensor 106 in response to operation of the optical navigation device 100 in the surface navigation mode. Similarly, the tracking logic 114 is configured to process a free space navigation signal from the free space navigation sensor 108 in response to operation of the optical navigation device 100 in the free space navigation mode.

In one embodiment, the mode selection logic 116 is configured to operate the optical navigation device 100 in either the surface navigation mode or the free space navigation mode. The mode selection logic 116 also may include an algorithm to determine which mode to implement at a given time. In one embodiment, the determination to implement either the surface navigation mode or the free space navigation mode may depend on a detector signal state of a lift detector, as described below.

The user control logic 118, like the mode selection logic 116, may implement different functionality depending on the navigation mode of the optical navigation device 100. In one embodiment, the user control logic 118 is configured to assign surface navigation functionality to the user input device 110 in response to operation of the optical navigation device 100 in the surface navigation mode. Similarly, the user control logic 118 is configured to assign free space navigation functionality to the user input device 110 in response to operation of the optical navigation device 100 in the free space navigation mode. The user input device 110 may be any combination of user input tools such as buttons, scroll wheels, sliders, and so forth. In this way, the user control logic 118 allows a user to implement different functionality for a particular user input device 110 depending on whether the optical navigation device 100 operates in the surface or the free space navigation mode. For example, the user control logic 118 may assign a "selection" function to a button in the surface navigation mode, and may assign an "advance" function to the same button in the free space navigation mode. However, these functions are merely exemplary and any combination of functions may be implemented with the surface and the free space navigation modes for a given user input device 110.

Figure 2:
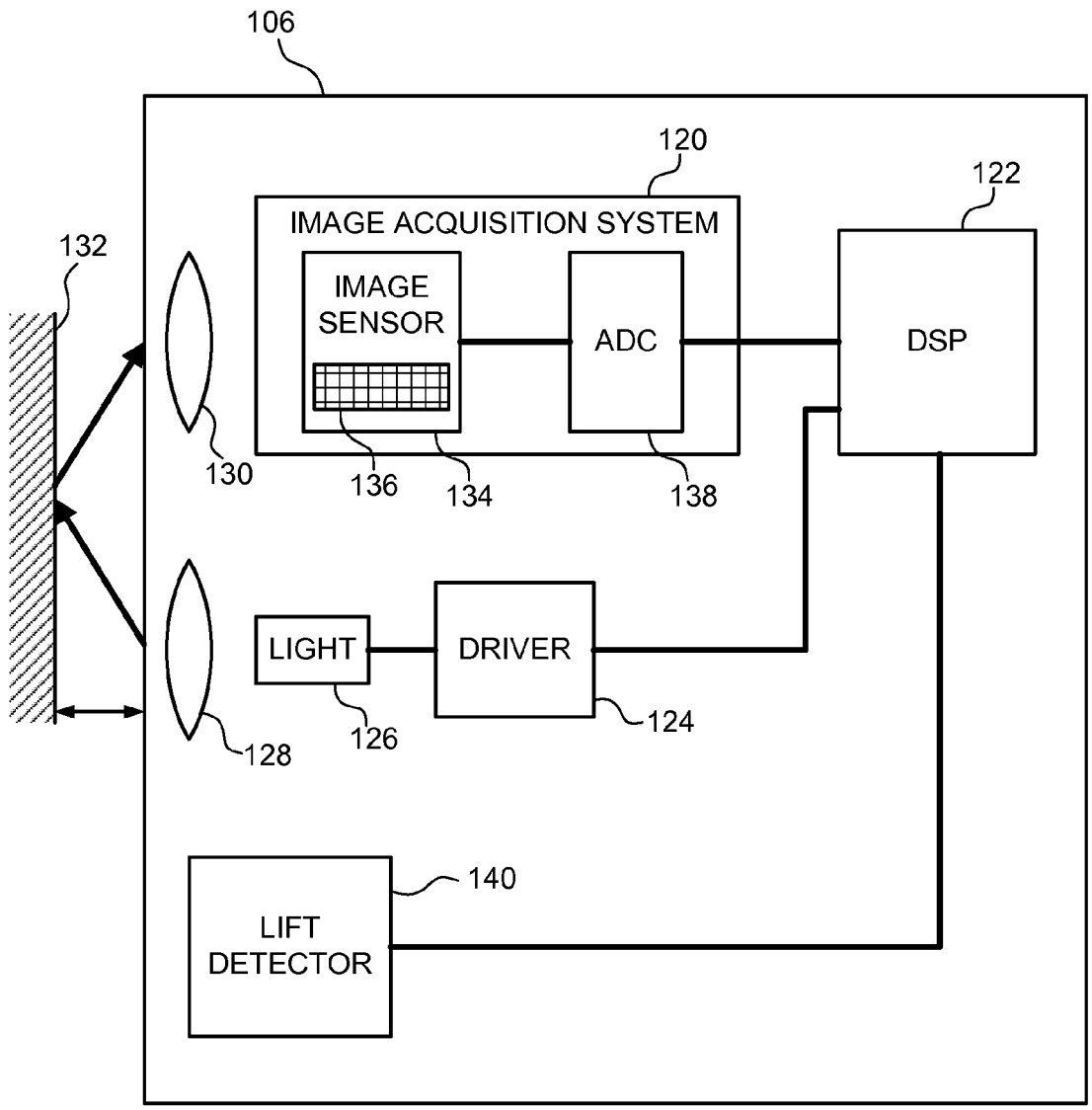
FIG. 2 depicts a schematic block diagram of one embodiment of a surface navigation sensor for use with the optical navigation device of FIG. 1.

FIG. 2 depicts a schematic block diagram of one embodiment of a surface navigation sensor 106 for use with the optical navigation device 100 of FIG. 1. Although the surface navigation sensor 106 is described in conjunction with the optical navigation device 100 of FIG. 1, some embodiments of the surface navigation sensor 106 may be implemented with other types of optical navigation devices. Moreover, some embodiments of the surface navigation sensor 106 may be implemented with non-optical navigation devices.

The illustrated surface navigation sensor 106 includes an image acquisition system (IAS) 120, a digital signal processor (DSP) 122, a light source driver 124, and a light source 126. The surface navigation sensor 106 also may include one or more optical elements 128 and 130. Other embodiments of the surface navigation sensor 106 may include fewer or more components. For example, some embodiments of the surface navigation sensor 106 may exclude one or more of the optical elements 128 and 130.

In one embodiment, the light source driver 124 controls the operation of the light source 126 (e.g., using a driver signal) to generate a light signal that is transmitted through the optical element 128 to a navigation surface 132. The reflected light signal is then received through the imaging optical element 130 and detected by the image acquisition system 120. In one embodiment, the light source 126 is a light emitting diode (LED). In another embodiment, the light source 126 could be any coherent or incoherent light source It should be noted that the distance between the surface navigation sensor 106 and the navigation surface 132 may vary depending on the application for which the surface navigation sensor 106 is used. In surface applications, the surface navigation sensor 106 may be relatively close to the navigation surface 132. For example, the surface navigation sensor 106 may be in physical contact with the navigation surface 132, or may be within a few millimeters of the navigation surface 132.

The depicted image acquisition system 120 includes an image sensor 136, which includes a pixel array 136. The image acquisition system 120 also includes an analog-to-digital converter (ADC) 138. In one embodiment, the image sensor 134 generates a plurality of electrical signals corresponding to incident light at the pixel array 136. Each of the generated electrical signals corresponds to one of the picture elements (or pixels) of the pixel array 136. In one embodiment, each pixel is a photosensor or other photosensitive device. The light signal reflected from the navigation surface 132 is imaged on the pixel array 136. In one embodiment, the optical element 130 facilitates resolution of microscopic surface images at the pixel array 136. The image sensor 134 then transmits the plurality of electrical signals to the analog-to-digital converter 138. The analog-to-digital converter 138 converts the plurality of electrical signals from analog signals to digital signals and then passes the digital signals to the digital signal processor 122.

After the digital signal processor 122 receives the digital form of the electrical signals from the analog-to-digital converter 138 of the image acquisition system 120, the digital signal processor 122 may perform additional processing using the electrical signals. The digital signal processor 122 then transmits one or more signals to the microcontroller 102. Exemplary types of signals transmitted from the digital signal processor 122 of the surface navigation sensor 106 to the microcontroller 102 include channel quadrature signals based on $\Delta x$ and $\Delta y$ relative displacement values. These signals, or other signals, may be indicative of a movement of the optical navigation device 100 relative to the navigation surface 132. Other embodiments of the digital signal processor 122 may transmit other types of signals to the microcontroller 102. As described above, the microcontroller 102 implements a variety of functions, including transmitting data to and receiving data from a host computer system (not shown).

In one embodiment, the surface navigation sensor 106 also includes a lift detector 140. Alternatively, the lift detector 140 may be in another part of the optical navigation device 100, separate from the surface navigation sensor 106. In another embodiment, the image acquisition system 120, instead of a separate lift detector 140, may provide lift detection information. In another embodiment, the image acquisition system 120, instead of a separate lift detector 140, may provide lift detection information. In some embodiments, another type of proximity sensor may be implemented instead of the lift detector 140.

The lift detector 140 is configured to change a detector signal state in response to detection of a transition of the optical navigation device 100 from a surface locality to a free space locality relative to a navigation surface 132. However, changing the detector signal state does not necessarily require that a detector signal be generated for each state (i.e., surface and free space) of the optical navigation device 100. Moreover, the lift detector 140 may simply generate a pulse signal, rather than a continuous signal, to indicate the transition of the optical navigation device 100 from surface locality to free space locality, or from free space locality to surface locality. From this description, it can be seen that the lift detector 140 may implement various forms of detector signals, depending on the design considerations and application constraints associated with a particular embodiment.

Figure 3:
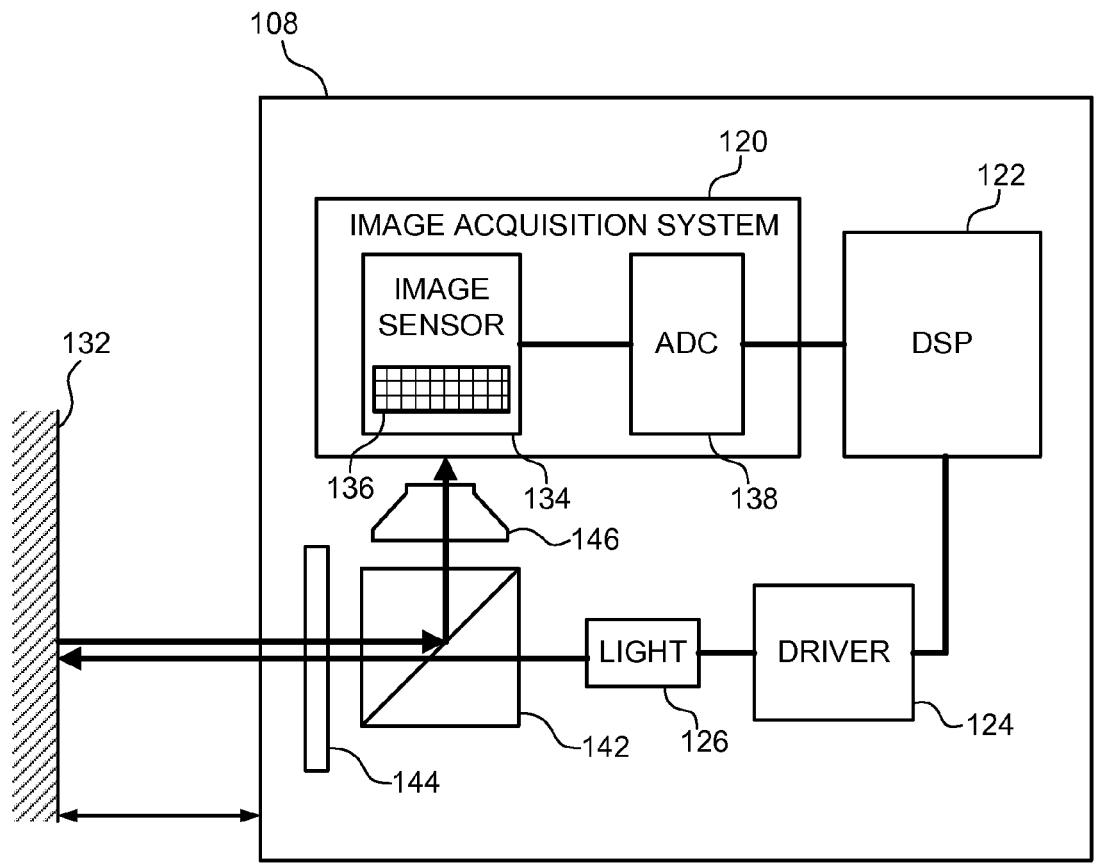
FIG. 3 depicts a schematic block diagram of one embodiment of a free space navigation sensor for use with the optical navigation device of FIG. 1.

FIG. 3 depicts a schematic block diagram of one embodiment of a free space navigation sensor 108 for use with the optical navigation device 100 of FIG. 1. Although the free space navigation sensor 108 is described in conjunction with the optical navigation device 100 of FIG. 1, some embodiments of the free space navigation sensor 108 may be implemented with other types of optical or non-optical navigation devices.

The illustrated free space navigation sensor 108 includes many of the same or similar components as the surface navigation sensor 106. These components are configured to operate in substantially the same manner described above, except as noted below. Additionally, in free space applications, the optical navigation device 100 may be relatively far from the navigation surface 132. For example, the optical navigation device 100 may operate outside of the surface optical range.

The free space navigation sensor 108 includes a beam splitter 142, a polarization rotation filter 144, and a telecentric lens 146. In one embodiment, the beam splitter 142 is a polarization cube beam splitter, although other types of beam splitters may be implemented. Where a polarized coherent laser with a small angle of divergence is used as the light source 126, the beam splitter 142 allows the light beam to pass through when the polarization states for both the light beam and the beam splitter 142 align. This may minimize power loss at the beam splitter 142, which results in more energy throughput after the beam splitter 142. Additionally, the beam splitter 142 may be used to direct the light signal, for example, from the coherent light source 126 to an aperture at the location where the light signal exits the optical navigation device 100.

In one embodiment, the polarization rotation filter 144 is coupled to or near the beam splitter 142. The polarization rotation filter 144 is configured to rotate the polarization state of the light beam so that the reflected light beam (e.g., from a free space navigation surface 132) returns to the beam splitter 142 with a polarization state that is different from the original polarization state of the light beam.

In one embodiment, the telecentric lens 146 is configured to image a free space object such as the navigation surface 132 onto the pixel array 136. Although other types of optical lenses may be used, the telecentric lens 146 maintains the same amount of navigation area regardless of the distance between the optical navigation device 100 and the navigation surface 132. As a result, the size of the area of interest may be controlled. Nevertheless, it should be noted that embodiments of the free space navigation sensor 108 also may be implemented using a conventional free space lens, rather than the coherent light source 126 and the telecentric lens 146 described above.

Figure 4:
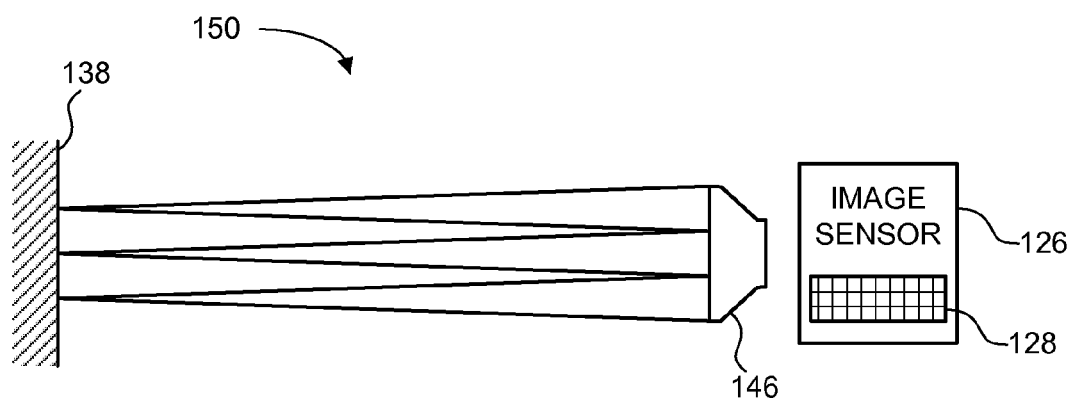
FIG. 4 depicts a schematic block diagram of one embodiment of a telecentric lens configuration for use in a free space navigation application.

FIG. 4 depicts a schematic block diagram of one embodiment of a telecentric lens configuration 150 for use in a free space navigation application. In particular, FIG. 4 illustrates that reflected light rays approach the telecentric lens 146 straight on (i.e., at zero angle of incidence) so that the dependence of the beam splitter 142 and/or the image sensor 134 on the angle of incidence is reduced or eliminated.

Figure 5:
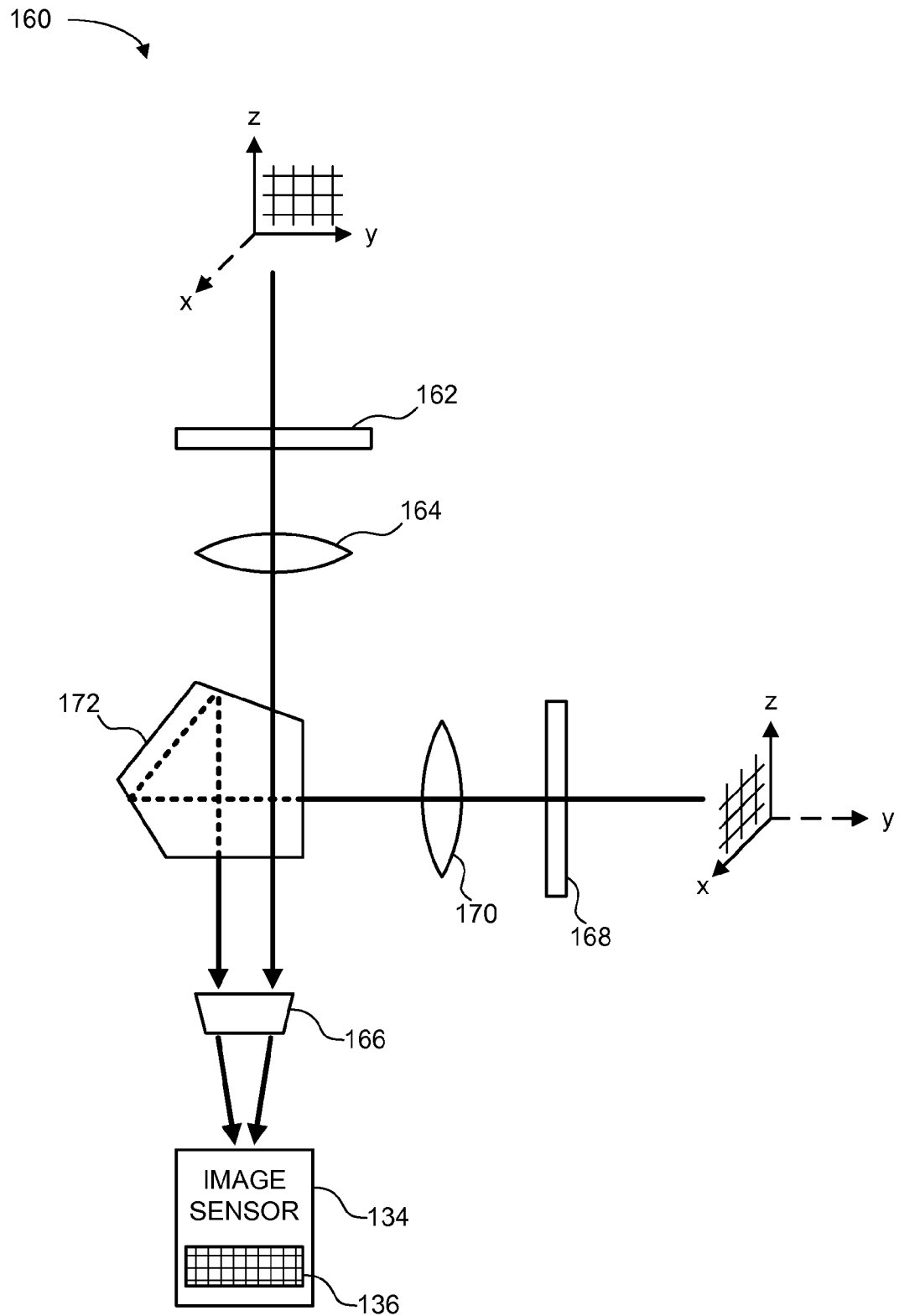
FIG. 5 depicts a schematic diagram of one embodiment of a multi-dimensional navigation sensor implemented with a single image sensor.

FIG. 5 depicts a schematic diagram of one embodiment of a multi-dimensional navigation sensor 160 implemented with a single image sensor 134. In one embodiment, the multi-dimensional navigation sensor 160 is implemented within the free space navigation sensor 108 of the optical navigation device 100 of FIG. 1. However, some embodiments of the multi-dimensional navigation sensor 160 may be implemented with other types of navigation sensors and optical navigation devices.

The illustrated multi-dimensional navigation sensor 160 includes a first color filter 162 and a first optical element 164 which pass filtered light to a prism 166. The multi-dimensional navigation sensor 160 also includes a second color filter 168 and a second optical element 170 which pass filtered light to a prism system including the prism 166. In one embodiment, the prism system also includes a pentaprism 172 to direct the filtered light from the second optical element 170 to the prism 166. The prism 166 focuses the two filtered light signals on the pixel array 136 of the image sensor 134. In one embodiment, the prism 166 is a dual triangular prism configured to converge the two filtered light images onto a single image sensor 134. In one embodiment, one of the filtered light images is used to determine movement in a first plane such as the y-z plane, and the other filtered light image is used to determine movement in a second plane such as the x-z plane, including a third dimension (e.g., the x dimension). In this way, the two filtered light images may be used in combination to detect three-dimensional movements of the optical navigation device 100 using a single image sensor 134.

As one example, the color filters 162 and 168 may be red and blue color filters, although other color filters may be used. Additionally, some embodiments of the multi-dimensional navigation sensor 160 may implement a more complex arrangement with more than two color filters. For example, some embodiments may use blue, green, and red color filters, with each color filter corresponding to a different light source and a specific dimensional component.

In one embodiment, the optical navigation device 100 may implement an algorithm to process the multi-dimensional movement of the optical navigation device 100. The algorithm may be implemented, for example, in the image sensor 134, in the DSP 122, or in the microcontroller 102. Furthermore, the algorithm may calculate three-dimensional movements by tracking either relative or absolute positions of the optical navigation device 100.

Figure 6:
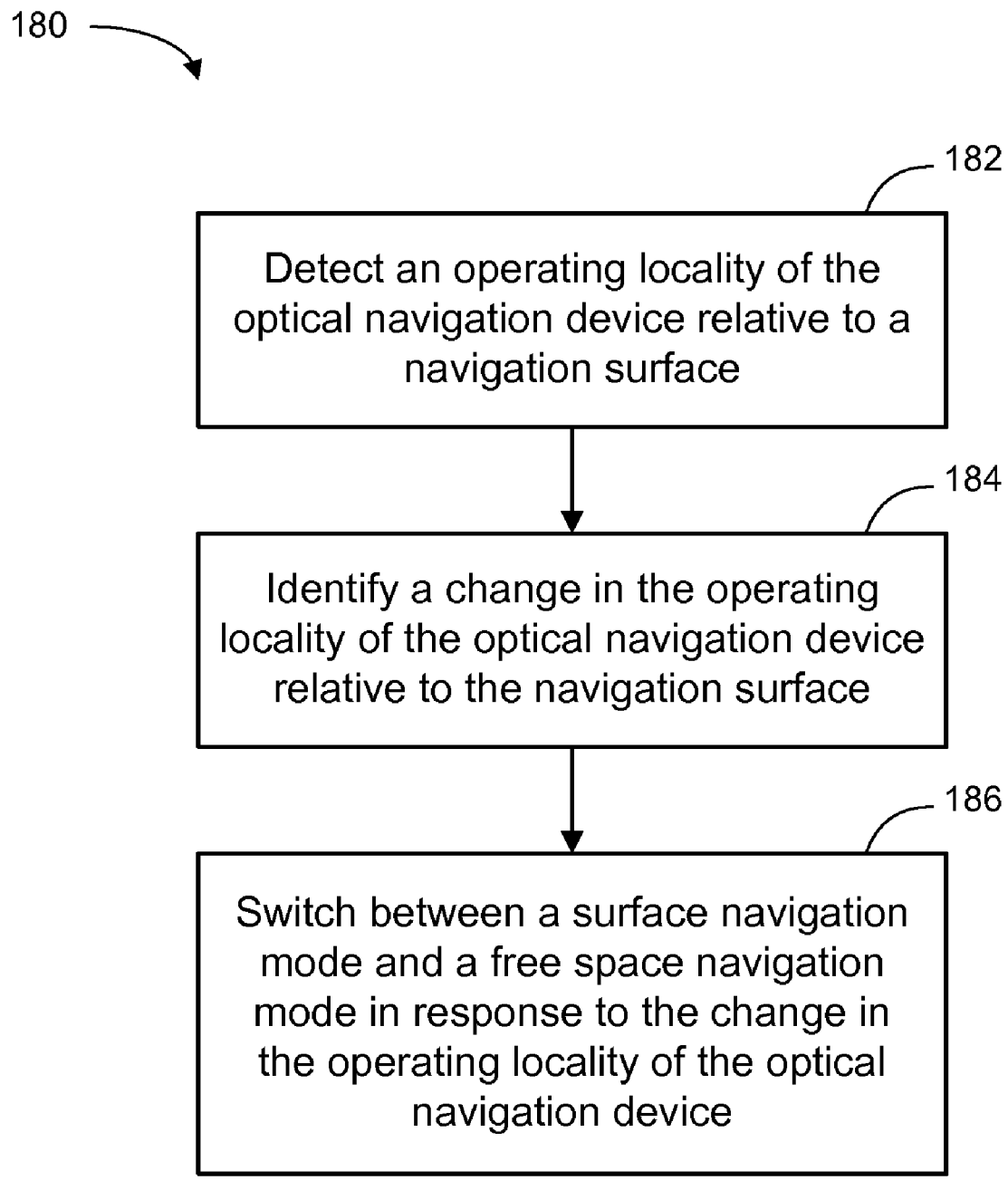
FIG. 6 depicts a schematic flow chart diagram of one embodiment of an optical navigation method for an optical navigation device.

FIG. 6 depicts a schematic flow chart diagram of one embodiment of an optical navigation method 180 for an optical navigation device 100. Although the optical navigation method 180 is described in conjunction with the optical navigation device 100 of FIG. 1, some embodiments of the method 180 may be implemented with other types of optical navigation devices.

At block 182, the optical navigation device 100 detects an operating locality of the optical navigation device 100 relative to a navigation surface 132. At block 184, the optical navigation method 100 identifies a change in the operating locality of the optical navigation device 100 relative to the navigation surface 132. The change in the operating locality may include a change between a surface operating locality and a free space operating locality. At block 186, the optical navigation device 100 switches between a surface navigation mode and a free space navigation mode in response to the change in the operating locality of the optical navigation device 100. In one embodiment, the optical navigation device 100 switches from the surface navigation mode to the free space navigation mode in response to a determination that the operating locality changes from a surface operating locality to a free space operating locality. Additionally, the optical navigation device 100 switches from the free space navigation mode to the surface navigation mode in response to a determination that the operating locality changes from a free space operating locality to a surface operating locality. The depicted optical navigation method 180 then ends.

Figure 7:
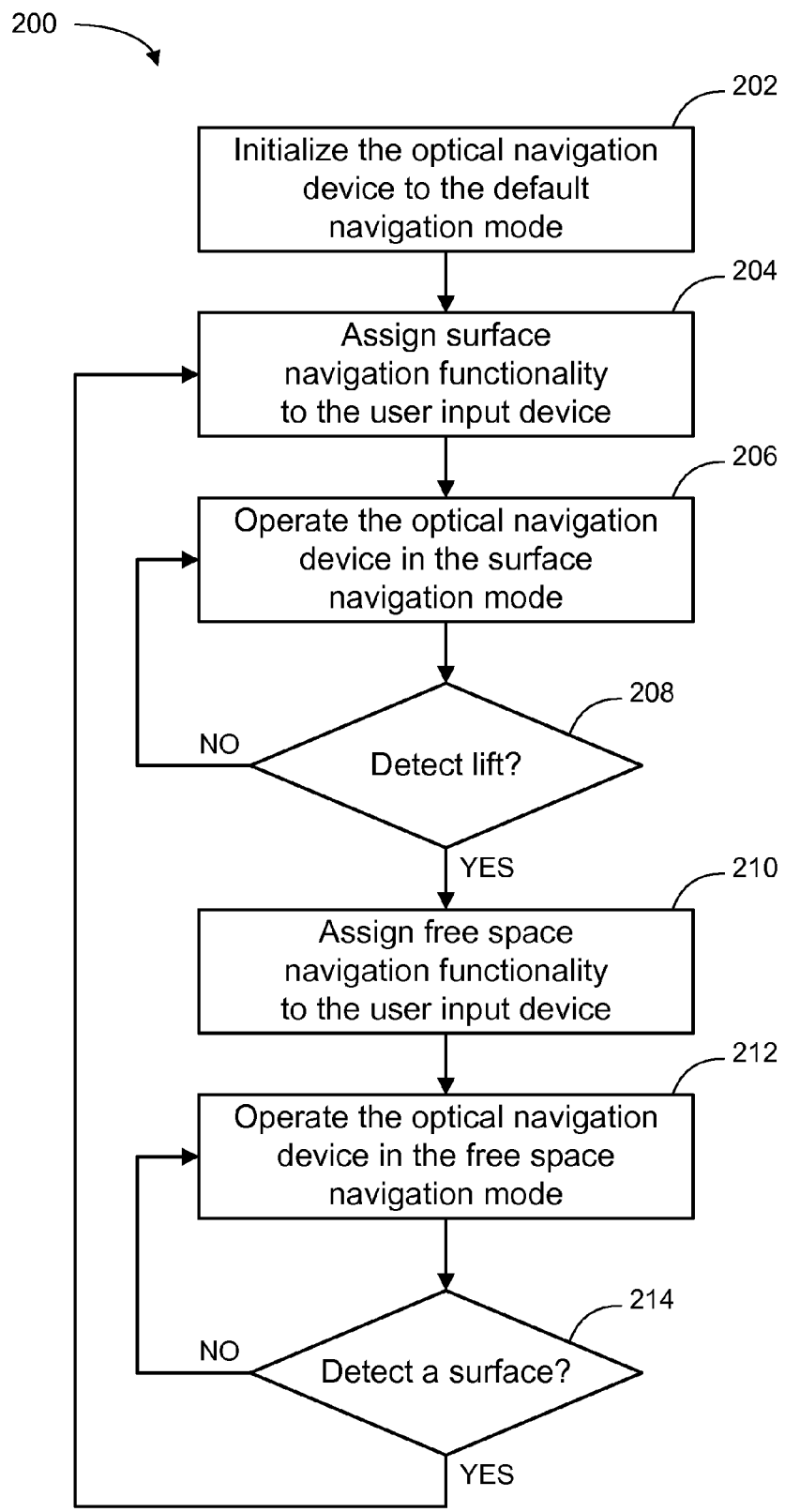
FIG. 7 depicts a schematic flow chart diagram of one embodiment of a method of operation for an optical navigation device.

FIG. 7 depicts a schematic flow chart diagram of one embodiment of a method 200 of operation for an optical navigation device 100. Although the method 200 is described in conjunction with the optical navigation device 100 of FIG. 1, some embodiments of the method 200 may be implemented with other types of optical navigation devices.

At block 202, the mode selection logic 116 initializes the optical navigation device 100 to a default navigation mode. In one embodiment, the default navigation mode is the surface navigation mode. Alternatively, the mode selection logic 116 may initialize the optical navigation device 100 to an application-specific mode, depending on the detected operating environment of the optical navigation device 100.

Assuming the surface navigation mode is the default navigation mode, at block 204 the user control logic 118 assigns surface navigation functionality to the user input device 110. At block 206, the optical navigation device 100 operates in the surface navigation mode. The optical navigation device 100 continues to operate in the surface navigation mode until the lift detector 140 detects lift beyond a threshold, at block 208. Alternatively, the image sensor 134 of the surface navigation sensor 106 is configured to detect the lift.

In response to detection of lift, at block 210 the user control logic 118 assigns free space navigation functionality to the user input device 110. At block 212, the optical navigation device 100 operates in the free space navigation mode. The optical navigation device 100 continues to operate in the free space navigation mode until the lift detector 140 detects a navigation surface 132, at block 214. Alternatively, the image sensor 134 of the surface navigation sensor 106 is configured to detect the navigation surface 132. Using these or similar operations, the optical navigation device 100 may alternate between operation in the surface and free space navigation modes. The depicted method 200 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation device comprising:
a microcontroller to process a movement of the optical navigation device;
a surface navigation sensor coupled to the microcontroller, the surface navigation sensor to generate a surface navigation signal in response to a surface navigation image; and
a free space navigation sensor coupled to the microcontroller, the free space navigation sensor to generate a free space navigation signal in response to a free space navigation image;
wherein the microcontroller is further configured to switch between a surface navigation mode that uses the surface navigation signal and a free space navigation mode that uses the free space navigation signal in response to a change in an operating locality of the optical navigation device relative to a navigation surface.

2. The optical navigation device of claim 1, the microcontroller comprising:
mode selection logic to operate the optical navigation device in either the surface navigation mode or the free space navigation mode; and
tracking logic coupled to the mode selection logic, the tracking logic to process the surface navigation signal in response to operation of the optical navigation device in the surface navigation mode, and the tracking logic to process the free space navigation signal in response to operation of the optical navigation device in the free space navigation mode.

3. The optical navigation device of claim 2, the microcontroller further comprising user control logic coupled to the mode selection logic, the user control logic to assign surface navigation functionality to a user input device in response to operation of the optical navigation device in the surface navigation mode, and to assign free space navigation functionality to the user input device in response to operation of the optical navigation device in the free space navigation mode.

4. The optical navigation device of claim 1, further comprising a lift detector coupled to the microcontroller, the lift detector to change a detector signal state in response to detection of a transition of the optical navigation device from a surface locality to a free space locality relative to a navigation surface.

5. The optical navigation device of claim 1, the free space navigation sensor comprising:
a coherent light source to generate and emit a coherent light signal; and
an optical lens coupled relative to a pixel array of an image sensor, the optical lens to image a free space object onto the pixel array.

6. The optical navigation device of claim 5, the optical lens comprising a telecentric lens.

7. The optical navigation device of claim 5, the free space navigation sensor further comprising:
a beam splitter coupled relative to the coherent light source and the image sensor, the beam splitter to direct the coherent light signal from the coherent light source to an aperture of the optical navigation device, and to direct a reflected light signal toward the pixel array of the image sensor; and
a polarization rotation filter coupled relative to the beam splitter, the polarization rotation filter to rotate a polarization state of the coherent light signal.

8. The optical navigation device of claim 1, further comprising:
a plurality of color filters of the free space navigation sensor, each of the color filters to filter a corresponding light signal;
an image sensor of the free space navigation sensor, the image sensor to process the filtered light signals; and
tracking logic of the microcontroller, the tracking logic to generate three-dimensional movement data to describe a three-dimensional movement of the optical navigation device, the three-dimensional movement data based on a plurality of the filtered light signals.

9. The optical navigation device of claim 8, the plurality of color filters comprising:
a blue color filter to filter a first light signal incident on the blue color filter from a first direction; and
a red color filter to filter a second light signal incident on the red color filter from a second direction, the second direction at least partially different from the first direction.

10. The optical navigation device of claim 8, further comprising a prism system to direct the filtered light signals from the plurality of color filters to the image sensor, the prism system comprising:
a dual triangular prism coupled between the plurality of color filters and the image sensor, the dual triangular prism to direct a pair of filtered light signals toward the image sensor; and
a pentaprism coupled between one of the plurality of color filters and the dual triangular prism, the pentaprism to change the direction of propagation of the corresponding light signal by about 90 degrees.

11. An optical navigation method for operating an optical navigation device, the method comprising:
detecting an operating locality of the optical navigation device relative to a navigation surface;
identifying a change in the operating locality of the optical navigation device relative to the navigation surface, the change in the operating locality comprising a change between a surface operating locality and a free space operating locality; and
switching between a surface navigation mode and a free space navigation mode in response to the change in the operating locality of the optical navigation device, wherein the surface navigation mode comprises generating and using a surface navigation image, and the free space navigation mode comprises generating and using a free space navigation image.

12. The optical navigation method of claim 11, further comprising:
tracking a location of the optical navigation device relative to a navigation surface in response to operation of the optical navigation device in the surface navigation mode; and
tracking a location of the optical navigation device relative to a free space navigation surface in response to operation of the optical navigation device in the free space navigation mode.

13. The optical navigation method of claim 11, further comprising:
assigning surface navigation functionality to a user input device in response to operation of the optical navigation device in the surface navigation mode; and
assigning free space navigation functionality to the user input device in response to operation of the optical navigation device in the free space navigation mode.

14. The optical navigation method of claim 11, further comprising:
emitting a coherent light signal from a coherent light source within the optical navigation device;
reflecting the coherent light signal off of a free space object;
passing the coherent light signal through a polarization rotation filter; and
imaging a telecentric image of the free space object onto a pixel array within the optical navigation device.

15. The optical navigation method of claim 11, further comprising:
filtering a plurality of light signals associated with a corresponding plurality of free space objects;
directing the filtered light signals toward a single image sensor;
imaging the free space objects based on the filtered light signals; and
tracking a three-dimensional movement of the optical navigation device based on three-dimensional movement data derived from the filtered light signals.

16. A computer readable storage medium embodying a program of machine-readable instructions, executable by a digital processor, to perform operations to facilitate optical navigation, the operations comprising:
detect an operating locality of the optical navigation device relative to a navigation surface;
identify a change in the operating locality of the optical navigation device relative to the navigation surface, the change in the operating locality comprising a change between a surface operating locality and a free space operating locality; and
switch between a surface navigation mode and a free space navigation mode in response to the identification of the change in the operating locality of the optical navigation device, wherein the surface navigation mode comprises generating and using a surface navigation image, and the free space navigation mode comprises generating and using a free space navigation image.

17. The computer readable storage medium of claim 16, the operations further comprising:
track a location of the optical navigation device relative to a navigation surface in response to operation of the optical navigation device in the surface navigation mode; and
track a location of the optical navigation device relative to a free space navigation surface in response to operation of the optical navigation device in the free space navigation mode.

18. The computer readable storage medium of claim 16, the operations further comprising:
assign surface navigation functionality to a user input device in response to operation of the optical navigation device in the surface navigation mode; and
assign free space navigation functionality to the user input device in response to operation of the optical navigation device in the free space navigation mode.

19. The computer readable storage medium of claim 16, the operations further comprising:
emit a coherent light signal from a coherent light source within the optical navigation device;
reflect the coherent light signal off of a free space object;
pass the coherent light signal through a polarization rotation filter; and
image a telecentric image of the free space object onto a pixel array within the optical navigation device.

20. The computer readable storage medium of claim 16, the operations further comprising:
filter a plurality of light signals associated with a corresponding plurality of free space objects;
direct the filtered light signals toward a single image sensor;
image the free space objects based on the filtered light signals; and
track a three-dimensional movement of the optical navigation device based on three-dimensional movement data derived from the filtered light signals.

* * * * *